US005571557A

United States Patent [19]

De Bastiani et al.

[11] Patent Number: 5,571,557
[45] Date of Patent: Nov. 5, 1996

[54] FAUX GLASS ETCH PRODUCT AND PROCESS OF PREPARING SAME

[75] Inventors: Norman P. De Bastiani, So. Hadley; Richard J. Boucher, Chicopee, both of Mass.

[73] Assignee: Chartpak, Inc., Leeds, Mass.

[21] Appl. No.: 437,707

[22] Filed: May 9, 1995

[51] Int. Cl.$^{6}$ .............................. B05D 1/38; B05D 5/06; B32B 5/16; B41M 3/12

[52] U.S. Cl. .......................... 427/152; 427/258; 427/379; 427/415; 428/324; 428/914; 156/239

[58] Field of Search ............................... 428/914, 323–4; 427/152, 258, 269, 282, 287, 379, 407.2, 415; 156/230, 239

[56] References Cited

U.S. PATENT DOCUMENTS 4,044,181 8/1977 Edhlund .................................... 428/40
4,820,559 4/1989 Steelman ................................ 428/36.1

OTHER PUBLICATIONS

"Reddi–Etch", Sales Brochure, 1993, Plaid Enterprises Inc. Norcross, GA.

*Primary Examiner*—Shrive Beck
*Assistant Examiner*—Fred J. Parker
*Attorney, Agent, or Firm*—Schweitzer, Cornman & Gross

[57] ABSTRACT

A transfer sheet for applying images to glass, plexiglass and the like to simulate the look of an etched surface is prepared by a three-step screen printing process wherein a polystyrene or release coated paper base is first coated with nitrocellulose and then heated. Thereafter a further coat comprising a combination of nitrocellulose, a silica flattening agent and mica/silica is applied followed by further heating. A screen printable solvent based adhesive suitable for polystyrene or paper is then applied, then heated and, thereafter a slip sheet applied to the adhesive side to permit stacking.

11 Claims, No Drawings

FAUX GLASS ETCH PRODUCT AND PROCESS OF PREPARING SAME

BACKGROUND OF THE INVENTION

Over the years people have sought to decorate glass and similar surfaces by the use of physical or chemical etching processes. As to the former fine particles are sand blasted against the surface to be decorated. This is a laborious, costly process. In chemical etching one must mask the surface to be decorated and apply strong and dangerous chemical agents to react with the non-masked surface. This too is a time consuming, costly procedure. Neither of the above is suitable for an average person to apply in the comfort of the home or similar environment to decorate his glassware or plastic items.

Thus there is a need for a product which could readily transfer images to glass, plexiglass or the like in the home in a simple and inexpensive manner.

While there is a product called "Reddi-Etch" on the market which is designed to simulate etched glass, it requires some 9 steps to be used by the consumer. It is a frosted crystal vinyl product by 3M Company containing hazardous chemicals not safe for skin or food contact. This product is not made by silk screening, contains a different base material and is significantly more complicated to apply as well as remove.

BRIEF DESCRIPTION OF THE INVENTION

The present invention produces a transfer product designed to look like an etched glass surface when transferred to glass, Plexiglass and the like (receiving surface). The transfer is simply applied by positioning the transfer product, having the desired etched glass graphics design, against a receiving surface and burnishing the opposite side with a flat stick (made of wood, plastic, metal). After the etched glass graphic design has detached itself from its carrier sheet and adhered itself to a receiving surface, the carrier sheet is pulled away, leaving the transferred etched glass graphics design firmly adhered to the receiving surface.

The transfer sheet itself is prepared by a multi-step silk-screen process wherein a silk screen is placed over a base material of polystyrene or a release coated paper base. The base is first coated with a nitrocellulose layer and then heated to a temperature sufficient to evaporate solvent to dry. Thereafter a mixture of said nitrocellulose layer, a silica powder flattening agent and a mica/silica pearlescent powder is applied, and the treated base subjected to a further heating step to remove solvent. A screen printable solvent based adhesive suitable for polystyrene or paper is then applied, and heated to dry. Thereafter a releasable slip sheet is positioned to the adhesive side to protect same.

For the sake of efficiency the transfer sheets can be heated in the form of 5–10 stacked sheets. The finished product can be cut up in sizes predetermined by the customer art work. As sold for home use this could be in the form of a 5 ½"×8" sheet or the like. Obviously the size of the final product sheet can be varied widely.

DETAILED DESCRIPTION OF THE INVENTION

The process of manufacture of the transfer sheet of the present invention utilizes a three step coating process utilizing standard screen printing techniques to lay down the appropriate layers of material described below.

In screen printing a screen, e.g., a stainless steel or nylon fabric screen, is employed as a base. A stencil is then applied on the screen as a film. The art work desired ("positive") is then applied to the stencil and the composite placed in a vacuum frame for exposure, via a silk screen exposure lamp, e.g., a metal halide lamp, for a limited exposure, such as 1.3 minutes. The stencil emulsion is washed off with a high power water wash. The screen is then dried in an oven, such as 30 minutes at 110° F. A liquid clay opaque is applied to exposed areas and the screen dried again for 30–40 minutes. One is now ready to print by the multi-step system described below. The size of the screen will control the amount and thickness of each coat.

The actual printing occurs by putting the screen on a press and laying an ink coating on top of it. A squeegee is moved to and fro to help push the ink through the desired design outlined on the positive and to lay it down on the polystyrene sheet.

In accordance with the present invention, a three step coating process of the base material is used.

Step 1: Coating with a nitrocellulose lacquer followed by a heating step to drive off solvent.

Step 2: Coating with a mixture of (a) nitrocellulose, (b) a silica powder flattening agent and (c) a mica/silica pearlescent powder acting as an inking coating followed by a heating step to remove solvent; and Step 3: Coating with a screen printable solvent based adhesive suitable for use on polystyrene or paper.

After the adhesive coating is applied, a releasable slip sheet is positioned on the adhesive side to permit stacking.

The base material or carrier sheet can be polystyrene with either a matt finish or a glossy finish, such as PolyFlex. Alternatively, the carrier may be a release coated paper. In general, the carrier sheet has a thickness of 3.9 to 5.5 mils, preferably 4.5 to 5.0 mils.

In all three steps a relatively fine screen made of stainless steel or fabric and less than 180 mesh, preferably about 150 mesh is used.

The coating step is run at ambient conditions 65° to 85° F., preferably 70° to 75° F. whereas the heating step is run at sufficiently high temperatures for drying to occur. Relative humidity is normally at 30–55%, preferably at 45–50%. When using a glossy polystyrene sheet (such as PolyFlex) as the carrier, temperatures typically range from 135°–150° F. When using a matt finish styrene, temperatures range to 170°–180° F. Somewhat higher temperatures can also be employed. Heating times are kept relatively short, e.g., 1 to 1.8 minutes.

The nitrocellulose lacquer is a typical decal lacquer.

The silica powder flattening agent is the type typically used in the printing industry as a flattening agent to cause a matte finish. The silica particles are generally less than 80 microns in size with particularly good results obtained by the use of very fine particles less than 10 microns and particularly 4 microns maximum in size.

The mica/silica compositions employed have a pearlescent quality and are typically 6–90 microns in size. They are sold in the printing and coating industries for flattening coatings. In addition to aluminum silicate present in the mica, the compositions may also contain titanium dioxide.

In step (2), the relative proportions of the three ingredients are as follows on a weight percentage basis.

| | Broad Range | Preferred Range |
|---|---|---|
| Nitrocellulose lacquer | 86 to 93 | 90 to 92 |
| Silica flattening agent | 3 to 7 | 3.4 to 6 |
| Mica/Silica | 4 to 7 | 4 to 4.6 |

The adhesive added in step (3) is a screen printable solvent based adhesive used for decals and wet transfers and is suitable for use with polystyrene or paper (depending on the base material used). Synthetic rubber solvent-based adhesives, such as KIWO PRINT, TC 500, made by KIWO Inc., of Seabrook, Tex., have been found to be particularly useful alone or in combination with other ingredients, such as minor quantities of alkyd resin.

The adhesive composition is applied by screen printing in ambient conditions. The thus coated film is subjected to drying conditions, for example, 1 minute at 160° F. or 170° F. to ensure complete dryness and transparency before applying a release liner. The release liner may be a coated paper (such as silicon coated paper) or a plastic sheet, such as polyethylene, polyester etc.

As noted previously the sheets can be stacked in groups of 5–10 as they move from stage to stage and particularly during the heating steps.

The following example will serve to further illustrate the present invention. Unless otherwise indicated, all percentages are by weight, and temperatures are degrees Fahrenheit.

EXAMPLE

The desired transfer sheet was made from a polystyrene sheet having a thickness of 4.5 to 5.0 mils.

In steps ( 1 ) to ( 3 ) a metal screen fabric of 150 mesh silk screen was employed. A stencil of 1.2 mils thickness was used having the desired shape of the design ultimately to be transferred by the consumer to a glass or plastic object to be decorated.

In each of steps (1) to (3) the sheet was treated on a conveyer moving at 30 feet/min. and processing 800 sheets/hour. The heat curing step was effected at 170° F. with an effective treating time of about 1 minute.

In step (1) the polystyrene carrier was treated with a nitrocellulose lacquer sold as DL-170 Clear from the Nazdar Company, Chicago, Ill.

In each of steps (1) to (3), the use of a 150 mesh silk screen will result in a coating of about 0.5 mils so that the final product of the three-step process will have about a 1.5 mils coating.

After the first coating step is completed, the sheets are heated for about 1 minute by forced hot air at 170° F. oven for drying.

In step (2) an ink composition of three basic components (referred to as frosty etch ink) was applied as a mixture in the proportions set forth below.

TABLE A

| Component | Trade Name | Weight Percentage |
|---|---|---|
| Nitrocellulose Lacquer | DL-170 | 91.9 |
| Silica Flattening Agent | Syloid #244 (W.R. Grace, Baltimore, MD) | 3.4 |

TABLE A-continued

| Component | Trade Name | Weight Percentage |
|---|---|---|
| Mica/Silica | Mearlin #911 OP (Mearl Corp., New York, NY) | 4.6 |

Syloid #244 has a maximum of 4 microns particle size. Mearlin #911 OP is a mica/silica formulation also containing some titanium dioxide and has a particle size of 6–90 microns.

The choice of the mesh screen defines the amount of coating which is applied. Thus the 150 mesh screen defines the weight and thickness of each coating.

The thus treated carrier is then subjected to heat treatment to effect drying of the deposited composition by being subjected to hot air drying at 170° F. for about 1 minute.

In step (3), an adhesive layer is applied to the polystyrene carrier by the same silk screen apparatus and method as previously described. The adhesive formulation was a mixture of TC-500 synthetic rubber solvent based adhesive sold by KIWO, Inc. of Seabrook, Tex., and an internally developed adhesive referred to as 7BF Adhesive in a proportion of 25 wt % TC-500 and 75 wt % 7BF.

After addition of adhesives to approximately 0.5 mils, the coated carrier is again heat treated at 170° F. for about 1 minute to dry the adhesive. A silicon treated slip sheet is placed on the adhesive side to protect the same.

When all steps are completed, the sheets, normally in the form of stacks, are cut to the desired size for ultimate packaging to the consumer.

The product made by the present process imparts an etch-like design to a glass or plexiglass item by a simple application process. The backing sheet to the carrier is removed and the sheet carefully positioned so that the design is on the appropriate surface to be decorated. Adhesion may begin as soon as the image touches the surface, and thus it is best to cut individual images from the sheet prior to positioning. Then one rubs over the entire image with a flat tool, such as a wooden stick enclosed as an applicator. The sheet is slowly pulled away from the surface and the image transferred to the surface.

Various modifications may be made to the present invention without departing from the spirit thereof.

Having described the invention, that which is sought to be protected is set forth in the following claims.

What is claimed is:

1. A process for manufacture of a transfer sheet for applying images to surfaces to simulate the look of an etched design which comprises utilizing a screen printing process to coat a base sheet selected from the group of polystyrene and a release coated paper in at least a three step process comprising:

(1) coating said base sheet with nitrocellulose lacquer by silk screening onto said base sheet, and then subjecting said thus coated base sheet to a heating temperature for a sufficient time to dry said coating;

(2) further coating said base sheet over the dried coating of step (1) with an etch ink mixture of said nitrocellulose lacquer, a silica powder flattening agent and a mica/silica pearlescent powder, and then subjecting said thus coated base sheet to a heating temperature for a sufficient time to dry said etch ink mixture coated thereon;

(3) thereafter applying by screen printing a solvent based adhesive suitable for polystyrene or paper to said dried base sheet coatings resulting from steps (1) and (2), heating to dry said adhesive, and positioning a releasable slip sheet on the adhesive side of the base sheet.

2. The process of claim 1 wherein said base sheet is glossy polystyrene and the heating temperatures of steps (1) and (2) is in the range of 135°–150° F.

3. The process of claim 1 wherein said base sheet is a polstyrene having a matt finish, and the heating temperatures of steps (1) and (2) is in the range of 170°–180° F.

4. The process of claim 1 wherein the silica powder flattening agent used in step (2) has a maximum silica particle size of 4 microns.

5. The process of claim 1 wherein said mica/silica pearlescent powder used in step (2) also contains titanium dioxide.

6. The process of claim 1 wherein said adhesive is a synthetic rubber solvent based adhesive which is screen printable and can be used on polystyrene and paper.

7. The process of claim 1 wherein the relative portions of components in said etch ink mixture are on a weight basis in the following ranges:

| | |
|---|---|
| nitrocellulose lacquer | 86 to 93 |
| silica powder flattening agent | 3 to 7 |
| mica/silica pearlescent | 4 to 7. |

8. The process of claim 1 wherein the relative portions of components in said etch ink mixture are on a weight basis in the following ranges:

| | |
|---|---|
| nitrocellulose lacquer | 90 to 92 |
| silica powder flattening agent | 3.4 to 6 |
| mica/silica pearlescent | 4 to 4.6. |

9. The process of claim 1 wherein a screen fabric of 150 mesh silk screen is employed.

10. The process of claim 1 wherein after step (3) the transfer sheets are cut into the desired size.

11. A transfer sheet for applying images to glass or plexiglass to simulate the appearance of an etched design which has been made by the process of claim 1.

* * * * *